US007441270B1

(12) United States Patent
Edwards et al.

(10) Patent No.: US 7,441,270 B1
(45) Date of Patent: Oct. 21, 2008

(54) CONNECTIVITY IN THE PRESENCE OF BARRIERS

(75) Inventors: James W. Edwards, Portland, OR (US); Ylian Saint-Hilaire, Hillsboro, OR (US); John W. Richardson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 09/612,324

(22) Filed: Jul. 6, 2000

(51) Int. Cl.
*H04L 29/00* (2006.01)

(52) U.S. Cl. .............................. 726/15; 726/11; 726/12; 726/13; 713/152; 709/206; 709/223; 709/227

(58) Field of Classification Search ................. 713/201, 713/150, 200, 152; 709/225, 227, 245, 206, 709/223; 726/11, 12, 13, 15
See application file for complete search history.

(56) References Cited

U.S. PATENT DOCUMENTS

| | | | | |
|---|---|---|---|---|
| 5,416,842 A * | 5/1995 | Aziz ........................... 380/30 |
| 5,550,984 A | 8/1996 | Gelb |
| 5,564,070 A * | 10/1996 | Want et al. .................. 455/507 |
| 5,826,014 A * | 10/1998 | Coley et al. .................... 726/12 |
| 5,915,008 A * | 6/1999 | Dulman ................. 379/221.08 |
| 5,944,823 A * | 8/1999 | Jade et al. ...................... 726/15 |
| 5,951,694 A * | 9/1999 | Choquier et al. ............... 714/15 |
| 5,983,350 A | 11/1999 | Minear et al. |
| 5,999,979 A * | 12/1999 | Vellanki et al. ............. 709/232 |
| 6,081,900 A * | 6/2000 | Subramaniam et al. ....... 726/19 |
| 6,104,716 A * | 8/2000 | Crichton et al. ............. 370/401 |
| 6,119,171 A * | 9/2000 | Alkhatib ...................... 709/245 |
| 6,141,759 A * | 10/2000 | Braddy ........................ 713/201 |
| 6,163,539 A * | 12/2000 | Alexander et al. .......... 370/392 |
| 6,185,606 B1 * | 2/2001 | Bereiter ...................... 709/206 |
| 6,219,706 B1 * | 4/2001 | Fan et al. ..................... 709/225 |
| 6,310,941 B1 * | 10/2001 | Crutcher et al. .......... 379/88.17 |
| 6,345,300 B1 * | 2/2002 | Bakshi et al. ............... 709/229 |
| 6,347,338 B1 * | 2/2002 | Segal .......................... 709/229 |
| 6,421,732 B1 * | 7/2002 | Alkhatib et al. ............. 709/245 |
| 6,484,261 B1 * | 11/2002 | Wiegel ....................... 713/201 |
| 6,571,290 B2 * | 5/2003 | Selgas et al. ................ 709/228 |
| 6,633,985 B2 * | 10/2003 | Drell ........................... 726/11 |
| 6,643,701 B1 * | 11/2003 | Aziz et al. ................... 709/227 |
| 6,714,982 B1 * | 3/2004 | McDonough et al. ....... 709/228 |
| 6,754,707 B2 * | 6/2004 | Richards et al. ............. 709/227 |
| 6,978,383 B2 * | 12/2005 | Boyle et al. .................... 726/15 |
| 2003/0182431 A1 * | 9/2003 | Sturniolo et al. ............. 709/227 |

* cited by examiner

*Primary Examiner*—Carl Colin
(74) *Attorney, Agent, or Firm*—Fish & Richardson P.C.

(57) ABSTRACT

A communication system includes a first endpoint located behind a first connectivity barrier, such as a firewall or a consumer gateway, and a second endpoint. A service is arranged to respond to a request from the first endpoint to establish communications with the second endpoint by assigning a server to handle a session between the first endpoint and the service. A session initiated by the second endpoint is established with the service if the second endpoint is located behind a second connectivity barrier. If the second endpoint is not located behind a connectivity barrier, a transport level communications connection can be established with the second endpoint. In some cases, the service can instruct the first endpoint to establish a direct session with the second endpoint.

27 Claims, 7 Drawing Sheets

CONNECTIVITY IN THE PRESENCE OF BARRIERS

BACKGROUND

The invention relates to connectivity in the presence of barriers.

Connectivity between the public Internet and corporate or private home networks can be limited by the presence of firewalls or consumer gateways designed to provide protection of valuable resources on the network.

Corporations, for example, typically permit limited incoming access to servers on their internal networks through firewalls, such as an electronic mail (email) gateway or public web site. Outgoing access through firewalls is typically permitted for a few standard protocols such as HyperText Transfer Protocol (HTTP) and File Transfer Protocol (FTP) through a protocol-specific proxy. For example, corporate users can web browse on the Internet through an HTTP proxy. Applications based on alternative protocols, such as buddy lists or Internet Protocol (IP) telephony, may not be able to be employed because of the lack of a suitable firewall proxy. Some applications take advantage of ubiquitously deployed proxies (e.g., an HTTP proxy) by using them to tunnel application data through a firewall. However, application-specific development must be provided to support tunneling.

Private home networks face similar connectivity issues. The industry is converging on a centralized access model for sharing Internet access among the personal computers (PCs) and devices in such networks. Centralized access is expected to be provided by consumer gateways based on Network Address Translation (NAT) which allows specific endpoints on the private home network to share outbound access to the Internet, but provides no general mechanism for inbound connections to a specific device on the network. A gateway can be configured manually to map incoming access at a specific network port to a single machine on the private home network. Alternatively, proxies can be installed on a gateway to handle access for a specific application or protocol in a much more flexible way than manually configured port mapping. However, because gateways can be implemented on a variety of operating system platforms, it may be difficult for application developers to provide proxies for each available system.

DETAILED DESCRIPTION

Figure 1:
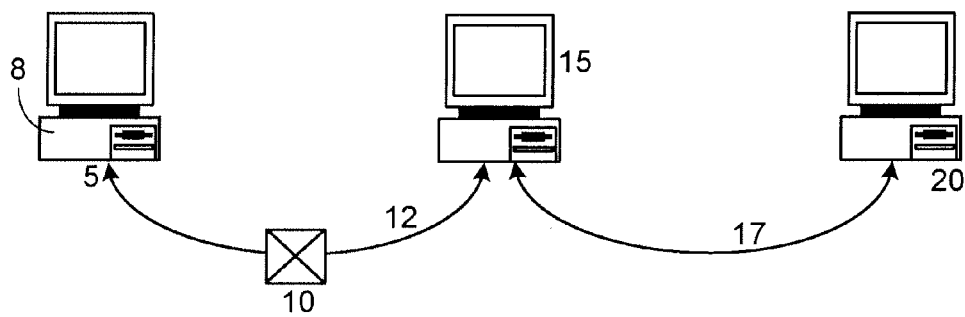
FIG. 1 illustrates an Internet Protocol (IP) forwarder/relay service supporting a forwarding session.

As shown in FIG. 1, a client source endpoint 5, such as a workstation on a corporate network or a private home network, or a computer connected to an Internet Service Provider (ISP), is configured with client software 8 associated with an Internet Protocol (IP) forwarder/relay service 15 described below.

The source endpoint 5 is coupled to a firewall 10 which limits inbound and outbound access to and from the source endpoint 5. The firewall 10 is coupled to a communication medium 12 such as a wide area network or the Internet. The source endpoint 5 establishes communications through the firewall 10 and the communication medium 12 to the IP forwarder/relay service 15. The service 15 can be implemented, for example, as a cluster of servers or a geographically dispersed set of servers. The number of servers can be increased as needed to partition the load of many clients.

FIG. 1 depicts a forwarding session in which the IP forwarder/relay service 15 connects through a communication medium 17 to a destination endpoint 20. The communication medium 17 can be any public network. The destination endpoint 20 can be any server or workstation that has connectivity with the communication medium 17.

In a forwarding session, data can be forwarded back and forth between the source endpoint and destination endpoint applications. The source endpoint 5 establishes a session using client software 8 to the service 15. The service 15 can forward data to other endpoints, such as the destination endpoint 20, that are not cognizant of the IP forwarder/relay service. In forwarding mode, the service 15 and the destination endpoint 20 use transport level communications (e.g., a TCP/IP connection) to transfer information between them.

Figure 2:
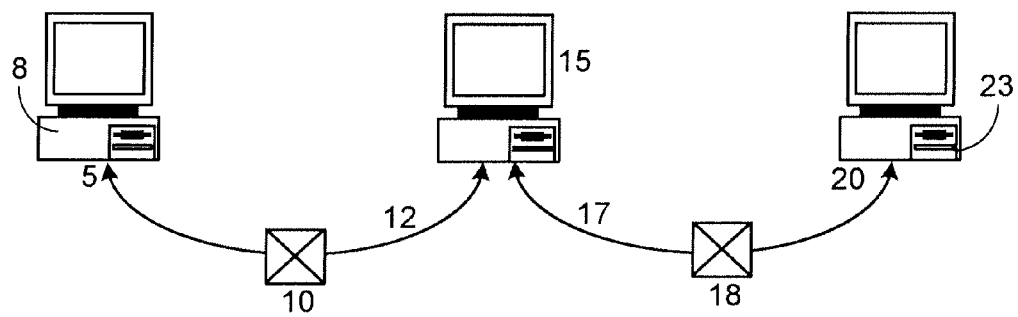
FIG. 2 illustrates an IP forwarder/relay service supporting a relay session.

FIG. 2 illustrates a relay session in which the IP forwarder/relay service 15 establishes a virtual connection between the source endpoint 5 and the destination endpoint 20 to relay data back and forth. As shown in FIG. 2, the IP forwarder/relay service 15 and the destination endpoint 20 have connectivity to a common communication medium 17. Connectivity to the destination endpoint 20 is through a firewall 18. To conduct a relay session, client software 23 must be installed on the destination endpoint 20 as well so that both endpoints 5, 20 can establish a session to the service 15.

Figure 3:
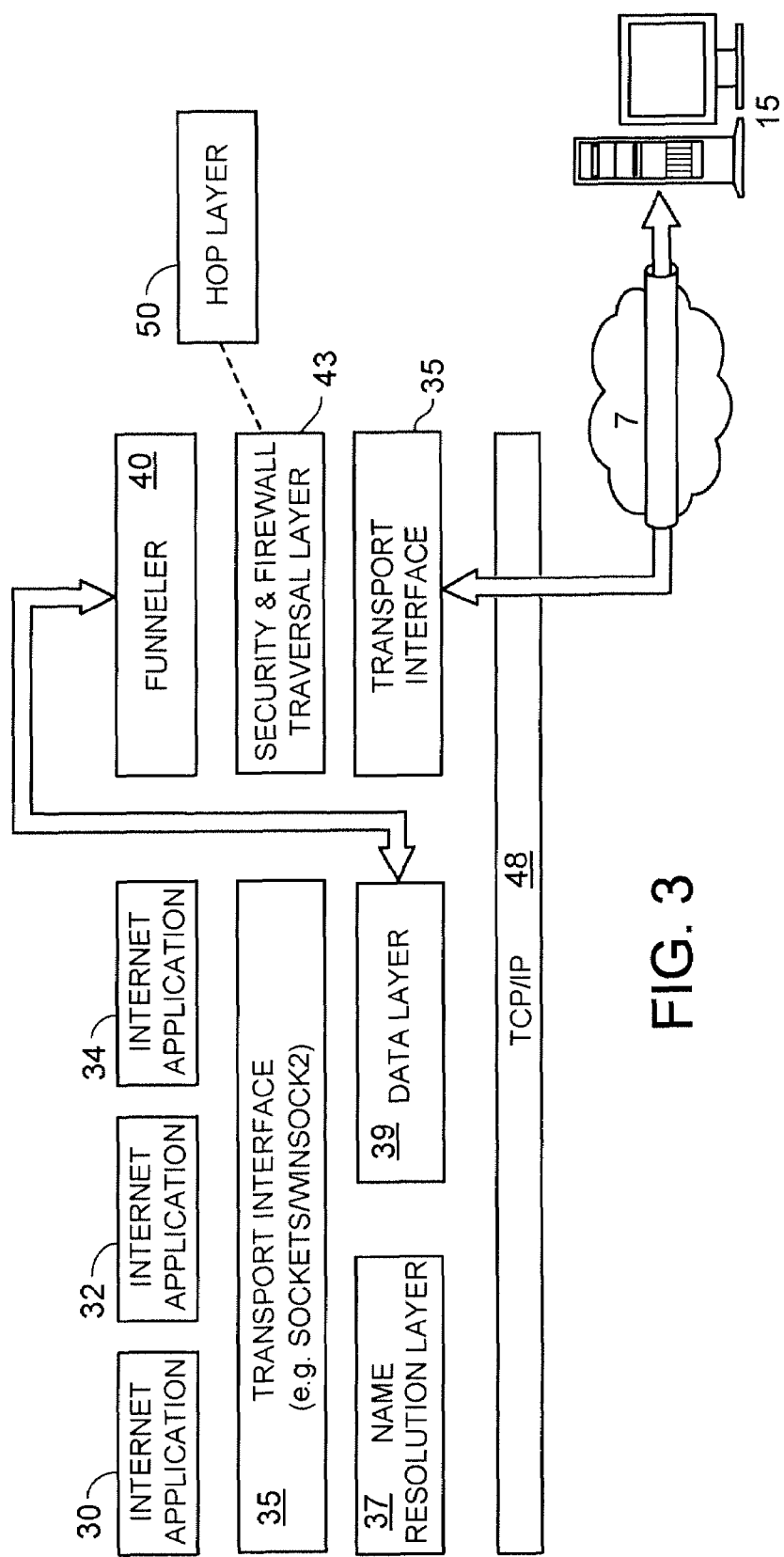
FIG. 3 shows software components associated with endpoints using the IP forwarder/relay service.

FIG. 3 illustrates components of the client software 8 installed on the source endpoint 5 to permit a forwarding or relay session to occur. Similar software components must be installed on the destination endpoint 20 for a relay session to occur. Internet applications 30, 32, 34, each of which has a user interface, can include buddy list applications such as AOL's AIM™ or Microsoft's MSN Messenger™. Alternatively, the applications 30, 32, 34 can include Telnet, file transfer, multi-user gaming or other types of network applications. The applications operate in the application layer of the protocol stack.

A standard application transport interface 35, such as Sockets or Winsock2, operates below the applications. The transport interface 35, also called an application programming interface (API), acts as a bridge between the application and the Transport Control Protocol/Internet Protocol (TCP/IP) suite.

The client software 8, 23 includes additional elements in the session layer of the protocol stack below the transport interface 35. A name resolution layer 37 and data layer 39, which can be combined or implemented separately, examine and process an application's TCP/IP data and name resolution operations and can perform actions such as header addition/removal and modification of name resolution requests.

An optional funneler component 40 in communication with the data layer 39 can be installed to combine the data from several applications into a single data stream to transmit or divide a combined received data stream into individual application streams. Framing information can be used to associate the data with local applications.

A security/firewall traversal layer 43 (S/FT layer) performs two main functions. First, the S/FT layer 43 can provide support for privacy and/or authentication between the source endpoint 5 and the IP forwarder/relay service 15. In a relay session, the S/FT layer 43 also can provide end-to-end privacy and/or authentication support for virtual communications between the source endpoint 5 and the destination endpoint 20. The security provisions can be based, for example, on standards such as Secure Socket Layer (SSL) or a combination of any known cryptography techniques.

In addition, the S/FT layer 43 establishes a firewall traversing session, or tunneling session, that allows data communication between the source endpoint 5 and the IP forwarder/relay service 15. The S/FT layer 43 automatically determines the appropriate proxied protocol, such as HTTP, FTP or SOCKS4/5, to use to tunnel application data through a firewall. The determination may include operations such as examining the local proxy configuration information and dynamically probing the firewall with test connections to the IP forwarder/relay service 15 or it may involve consulting a Dynamic Host Consulting Protocol (DHCP) server or using a service discovery protocol such as Service Location Protocol (SLP), Jini, or Universal Plug and Play (UpnP). If, for example, HTTP is used as the proxied protocol, request pipelining and multi-part return messages can be used to support two-way symmetric communications. Data in the S/FT layer 43 may be directed to (or from) the funneler 40 if support for multiple internet applications is required. Alternatively, a separate instance of the S/FT layer 43 can reside in each application's process space and data can be sent over per-application firewall traversal sessions.

Firewall traversal sessions are initiated by the endpoints 5, 20. As previously noted, a firewall traversal session 7 is established between the source endpoint 5 and the IP forwarder/relay service 15 in both forwarding and relay modes of operation. In the forwarding mode (FIG. 1), an actual TCP connection or User Datagram Protocol (UDP) association for transporting application data can be made between the IP forwarder/relay service 15 and the destination endpoint 20. The forwarding mode can enable client/server applications that otherwise would have difficulty traversing firewalls. Exemplary applications include client/server-based buddy lists, multi-user games, and IP telephony conferencing.

In the relay mode, a firewall traversal session also is established from the destination endpoint 20 to the service 15. Thus, the IP forwarder/relay service 15 acts as an intermediary between two (or more) separate firewall traversal sessions. Virtual TCP connections or virtual UDP associations are set up between the source and destination endpoints 5, 20. In addition to client/server applications, the relay mode can also enable peer-to-peer applications that otherwise would have difficulty traversing firewalls such as peer-based buddy lists, multi-user games, and IP telephones.

Destination network addresses, as well as other information used to multiplex or demultiplex application data, are conveyed in headers contained within the transported session data. The IP forwarder/relay service 15 can add, remove and examine session headers and can establish mapping functions to facilitate the forwarding or relaying of data to the intended endpoint(s). In forwarding mode, when an application on the destination endpoint 20 requires that network addressing information be included in its payload, the IP address for the application running on the source endpoint 5 can be made to appear as if it is the IP address of the service 15.

In one implementation, the service 15 uses a Domain Name System (DNS) host naming convention to identify endpoints 5, 20. Other directory systems also can be supported by the service 15. The IP forwarder/relay service is assigned a domain name, for example "service.com." Users at the endpoints 5, 20 are assigned sub-domain names. In one implementation, the sub-domain names are based upon information readily known by others such as a name. Thus, John Smith might register as "jsmith.service.com." In some instances, a sub-domain such as "jsmith.service.com" may not be sufficient to identify a unique endpoint 5, 20. For example, a user may use the service 15 from a variety of locations. To avoid naming conflicts, zip codes and/or locations may be added to the sub-domain names. Thus, an endpoint associated with a user's workplace, "work.jsmith.97211.service.com," can be distinguished from a mobile endpoint "mobile.jsmith.97211.service.com" that is associated with the same user.

The assigned sub-domain name can be used to configure the system software 8, 23 for a given endpoint 5, 20. A user at a source endpoint 5 attempting to relay data to a destination endpoint 20 through the IP forwarder/relay service 15 does not necessarily need to know beforehand the full sub-domain name of the destination endpoint. To illustrate, a destination endpoint may be a private home network with several computers. A fully qualified domain name (FQDN) for one computer could be "denpc.home.jsmith.97211.service.com." If the user at the source endpoint 5 knows only "service.com" or "jsmith.97211.service.com," the client system software 8 can provide a dialog box with a list of the constituents of the private home network to choose from. Furthermore, the dialog box approach can be extended to allow endpoints to be distinguished by unique identifiers other than sub-domain names.

Figure 4:
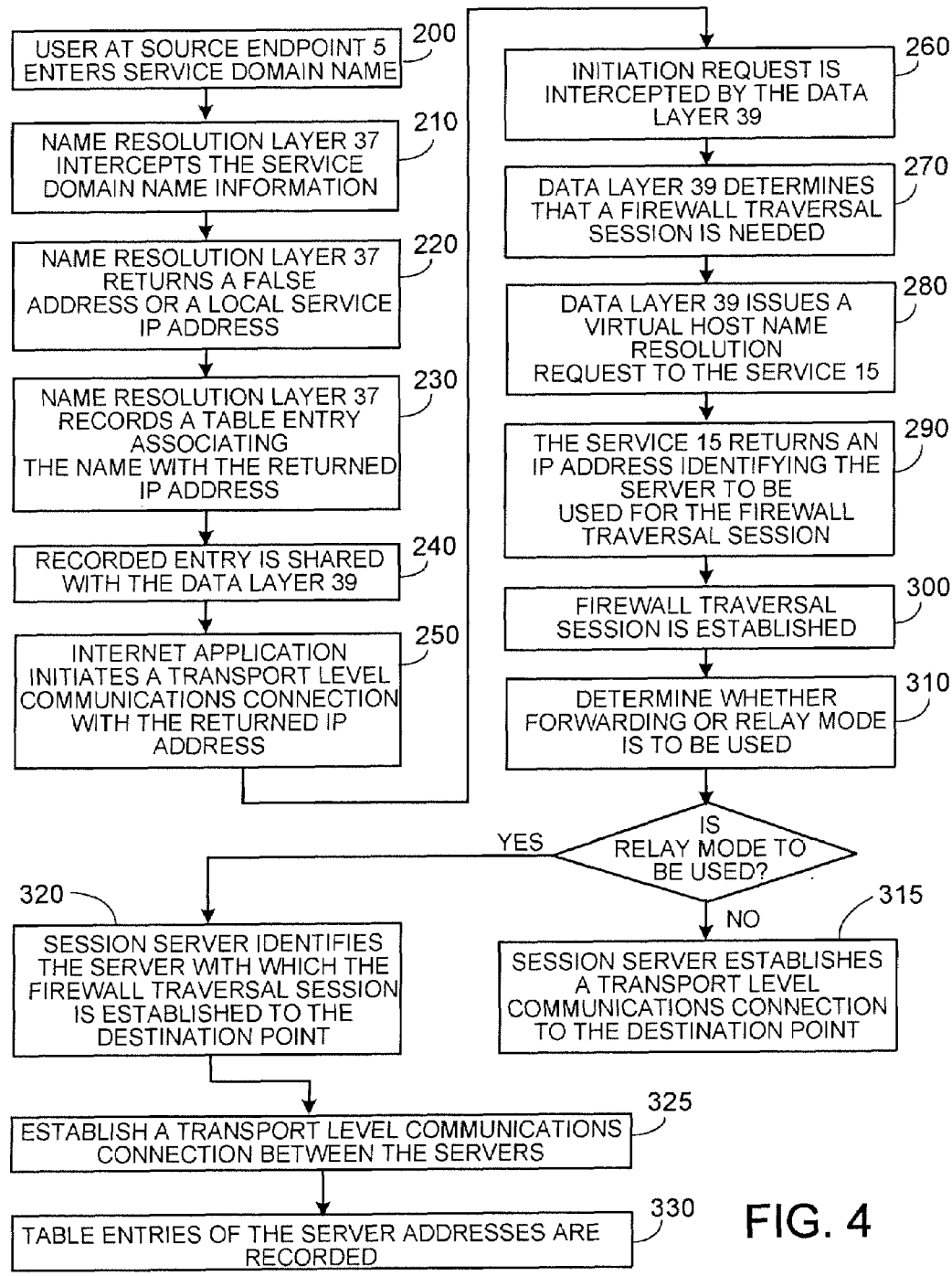
FIG. 4 is a flow chart of a process for establishing connectivity between source and destination endpoints using the forwarder/relay service.

As indicated by FIG. 4, a user enters 200 at least the service domain name into the system to request use of the service 15. For example, the user would enter the domain name "service.com." The name resolution layer 37 of the client system software 8 intercepts 210 the domain name information that was entered into the system. For requests that involve the service, the name resolution layer 37 returns 220 either a special non-routeable IP address or else an IP address from a local pool associated with the given service 15. The name resolution layer 37 records 230 a table entry associating the requested name with the returned IP address. That information then is shared 240 with the data layer 39. The particular application 30, 32, 34 initiates 250 a transport level communication, for example, a TCP connection or UDP message, using the returned IP address. The initiation request is intercepted 260 by the data layer 39. The data layer 39 then retrieves the previously-recorded table entry to obtain the complete information needed to determine 270 whether a firewall traversal session to the service 15 should be established and whether the session should use the forwarding or relay mode.

Depending upon the domain name entered originally, the data layer 39 may require more information in order to decide whether a forwarding or relay session is necessary.

If a fully qualified user domain name such as "jwblow.23114. service.com" originally were supplied, then the relay mode of operation would be used. On the other hand, if only the domain name "service.com" were originally entered, the data layer 39 would recognize the service host name, but would need additional information to determine whether the session should use the forwarding or relay mode. Specifically, the user would supply either a real destination IP address or physical host name for the forwarding mode, or would select a fully qualified domain name (FQDN) within the service for the relay mode. To obtain the needed information, the data layer 39 can query the user with a dialog box.

Once the user has supplied the requested information, the data layer 39 issues 280 a name resolution request so that a server within the service 15 can be assigned for the firewall traversal session. The resolution request, which includes a virtual host name associated with the client endpoint 5, bypasses the name resolution layer 37 and is issued directly to a domain name resolving server in the IP forwarding/relay service 15. The service 15 returns 290 an IP address that the physical server uses during the firewall traversal session.

Figure 5:
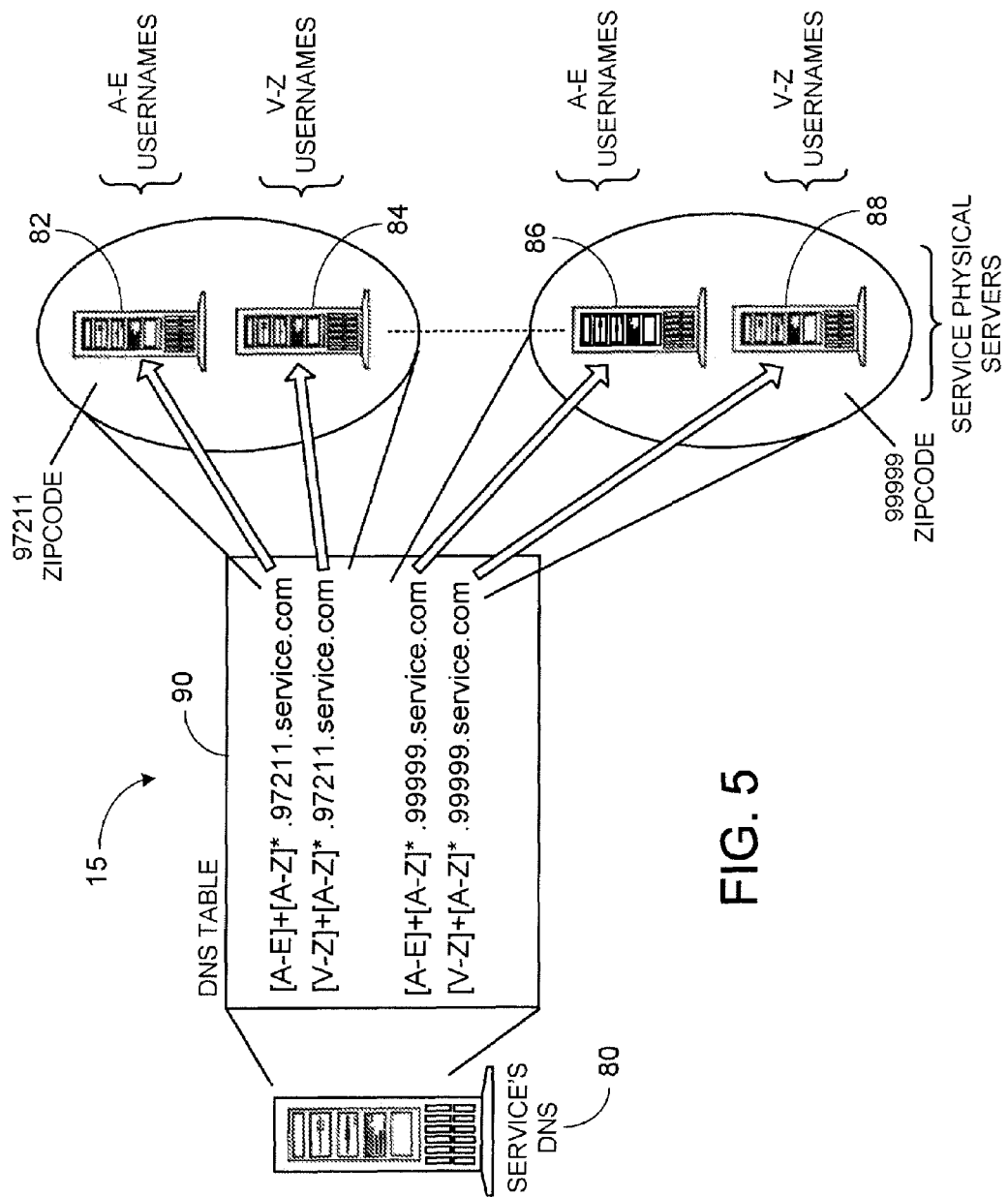
FIG. 5 illustrates hierarchical static mapping that can be used to assign a server to handle a session between an endpoint and the IP forwarder/relay service.
Figure 6:
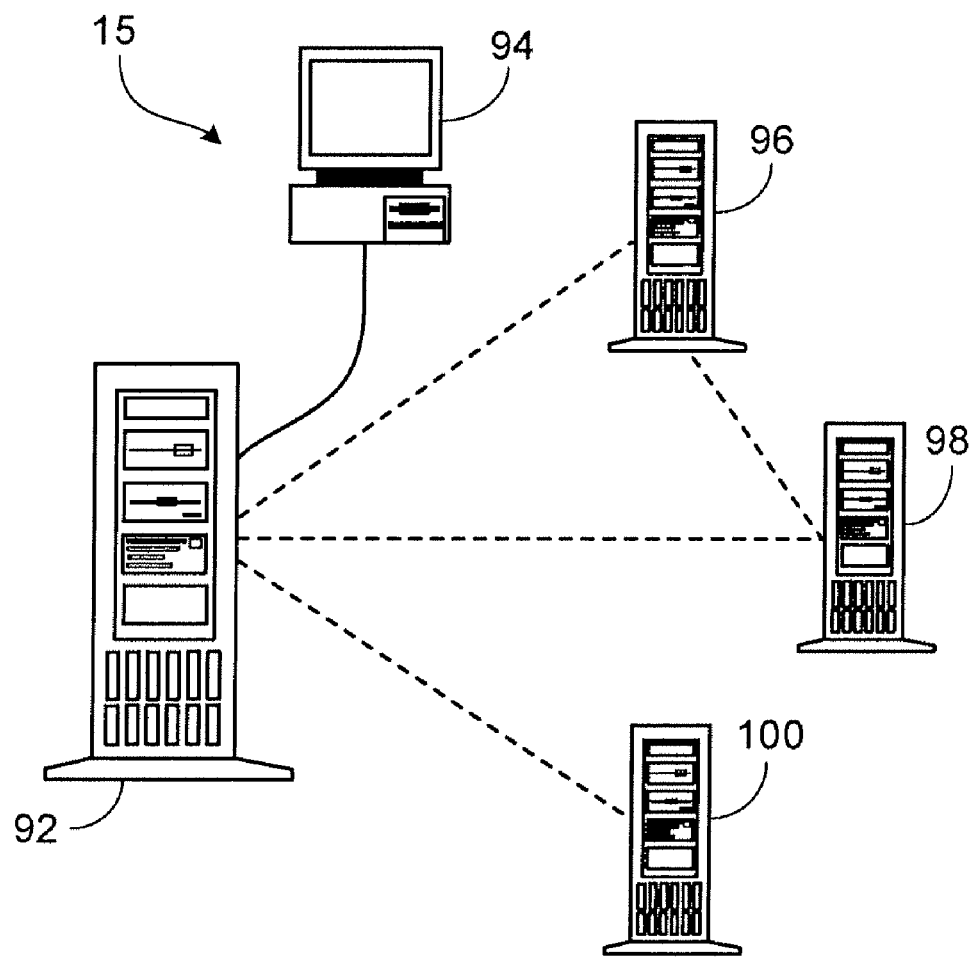
FIG. 6 illustrates dynamic mapping that can be used to assign a server to handle a session between an endpoint and the IP forwarder/relay service.

FIGS. 5 and 6 illustrate various techniques that the IP forwarding/relay service 15 can employ to assign a physical server to be used for the firewall traversal session. The features are scalable and can be used to map virtual host names to a large number of geographically dispersed servers.

In one implementation, shown in FIG. 5, a DNS server 80 within the IP forwarder/relay service 15 uses hierarchical partitioning as the basis for selecting the proper physical server (e.g. 82, 84, 86 or 88) to establish a session. The DNS table 90 contains a set of regular expressions to compactly specify a static mapping relationship between the endpoint virtual host names and the physical servers 82 through 88. According to the table 90, servers 82 through 84 service requests directed to zip code 97211 and servers 86 through 88 service requests for zip code 99999. Within these two groups, the servers are selected based on the first letter of the user name.

FIG. 6 shows a dispatch/switching server model that can be used for dynamic mapping of endpoint virtual host names. The source endpoint 5 sends a virtual host name resolution request to a dispatch server 92 in the service 15. Based on information received from a load balancing system 94, the dispatch server 92 returns the IP address of a particular switching server 96, 98, 100, that will provide the IP forwarding/relay functionality for the client endpoint session. The load balancing system 94 communicates with the various switching servers 96, 98, 100 to track the loading of those servers dynamically. In some implementations, the load balancing system 94 can be incorporated into the dispatch server 92. After a switching server 96, 98 or 100 has been assigned, the client endpoint 5 sets up a session to the assigned switching server.

An internal dynamic directory can be used in the name resolution process to map an endpoint to a server. In that case, the load balancing system 94 can monitor the dynamic loading of each switching server and assign the least loaded switching server 96, 98, 100 to handle the session. A corresponding entry can be added to the internal directory to reflect the assignment. The entry contains the mapping from a specific endpoint, such as the endpoint 5, to the assigned switching server. It allows the service 15 to match client endpoints for relay mode and establish a virtual connection between them.

Once the IP address for the session server is obtained, the data layer 39 at the client endpoint 5 establishes 300 a firewall traversal session for the application 30, 32 or 34. Once established, the application's IP flow can be tagged 310 by the client software 8 with an indication of whether the service 15 should operate in forwarding or relay mode. Alternatively, the service 15 can determine whether forwarding mode or relay mode is to be used based on the destination endpoint's physical address or virtual host name supplied by the source endpoint 5.

Figure 7:
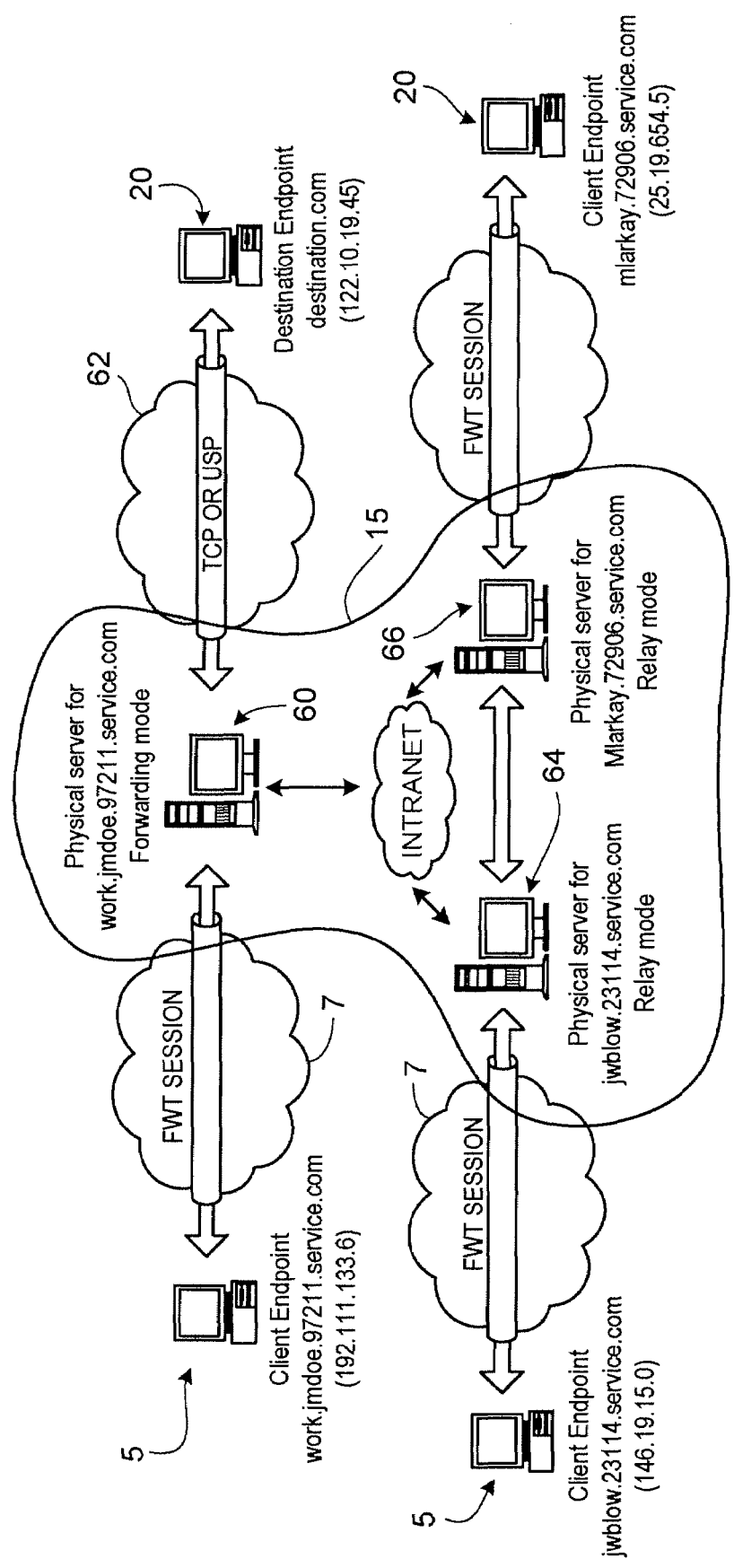
FIG. 7 illustrates additional details of exemplary forwarding mode and relay mode firewall traversing sessions.

As illustrated in FIG. 7, in the forwarding mode, a session server 60 establishes 315 the required TCP connection or UDP association 62 and forwards the data to the IP address for the destination endpoint 20.

In the relay mode, a session server 64 can use its own domain name system or an internal dynamic directory to identify 320 the physical server 66 for the destination endpoint 20. Assuming that the destination endpoint 20 is listening for TCP/IP requests, a TCP connection or UDP association is established 325 between the source and destination servers 64, 66, creating a virtual connection between the source 5 and destination endpoints 20. Table entries can be recorded 330 so that future sessions between the endpoints occur over established connections within the service. In some situations, a single server may act as both the source and destination servers 64, 66.

An application that is listening for incoming requests for transport level communications connections (e.g., TCP connections or UDP messages) can be handled as follows. The data layer 39 at the destination endpoint 20 can use local policies and configurations to determine whether the applications 30, 32, 34 require remote listening at the service 15 and a corresponding firewall traversal session. The local policies may indicate that remote listening always is used for certain applications, while for other applications the user should be prompted for further input using, for example, a dialog box. Where remote listening is to be used, the data layer 39 in the destination endpoint 20 establishes a firewall traversal session to the physical server assigned to the local user in the same manner as described above for the source endpoint 5. Information about an individual listen request is conveyed over the firewall traversal session to the service 15. Such information can include the fully qualified domain name and application port number for the destination endpoint 20.

As described above, a user can enter the service domain name (e.g., "service.com") as the destination address to initiate use of the service 15. In other implementations, instead of entering the service domain name, the user can specify an actual IP address or host name. An automatic determination of whether forwarding mode is appropriate can be made based on the address. For example, network addresses outside an internal domain specified through configuration of the client system software 8, 23, or discovered from standard network configuration parameters such as the user's subnet, are likely to need forwarding. The software 8, 23 can also be configured to recognize specific addresses for which forwarding is required. Alternatively, forwarding mode can be used as a backup after a direct attempt at connection to an external address fails.

To increase efficiency, a DNS resolution request for a destination endpoint 20 should resolve successfully only if the destination endpoint is, in fact, listening on at least one port. Also, search directories contain entries for listening endpoints. Such features can increase the likelihood of obtaining a connection in relay mode to a destination endpoint and can reduce the overhead associated with setting up a firewall traversal session for which connections will eventually fail because there is no corresponding listening endpoint.

In some implementations, each client endpoint on an internal network can include the software components discussed in connection with FIG. 3. Alternatively, a local routing agent can be used. The local routing agent makes it unnecessary for each endpoint located in an internal network to be equipped with system software 8, 23. The local relay agent can act as a virtual router for all inbound communication. The IP forwarder/relay service 15 requires only the address of the local relay agent. The agent then handles the distribution and redirection of communication to particular machines in the internal network, as well as the sessions to the IP forwarder/relay service 15.

Figure 8:
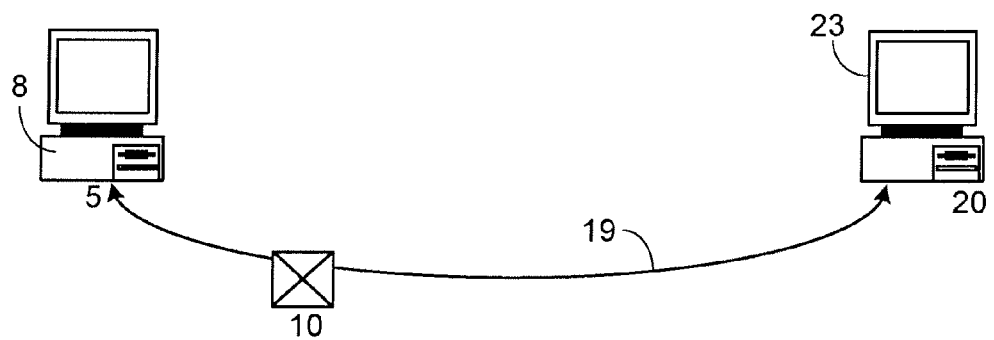
FIG. 8 illustrates a direct session between endpoints.

A hop component 50 (FIG. 3) also can be included in the client software 8, 23 to allow a direct connection to the destination endpoint 20 to be made under certain circumstances. In particular, as shown in FIG. 8, when only the source endpoint 5 is located behind a firewall 10 and both the source and destination endpoints include the client software 8, 23, a direct firewall traversal session can be established between the endpoints 5, 20 instead of using the relay mode of operation of the service 15. In such a situation, the service 15 initially can be used to determine whether the relay mode of operation should be used to provide the virtual connection or whether the hop layer 50 in the source endpoint 5 should be instructed to initiate a direct session with the destination endpoint 20 over a communication medium 19. Alternatively, the hop layer 50 may first attempt a direct session with the destination endpoint 20 and upon failure to establish communications fallback to using the service 15 in the relay mode of operation.

Use of virtual host names for identifying parties registered with the service also can facilitate maintaining a connection to a destination endpoint when the source endpoint 5 roams between networks. For example, if the source endpoint 5 is a wireless, mobile device that can roam from one network to another, the service 15 can maintain the connection to the destination endpoint 20 even if the connection to the source endpoint temporarily is lost. In the event that the connection to the source endpoint 5 is lost temporarily, the destination endpoint 20 would not be made aware of that fact because its connection to the service 15 is maintained. To reestablish the session between the source endpoint 5 and the service 15, the client software 8 can retain information regarding the state of the session. When connectivity to the service 15 subsequently is reestablished, the information regarding the state of the lost session can be used to allow the session to continue from the point when the connection was lost.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the claims.

What is claimed is:

1. A method of establishing communications comprising:
    establishing a virtual connection between a source computer system assigned a source virtual host name and located behind a first connectivity barrier and a destination computer system assigned a destination virtual host name and located behind a second connectivity barrier, wherein establishing the virtual connection comprises:
    establishing, by the source computer system, a first persistent, bi-directional barrier traversal session between the source computer system and a forwarder/relay service, wherein establishing the first session includes representing data of a first application in a format associated with a proxy network protocol configured to communicate data corresponding to another application so that the data of the first application is communicated through the first connectivity barrier using the proxy network protocol; and
    establishing, by the destination computer system, a second persistent, bi-directional barrier traversal session between the destination computer system and the forwarder/relay service, the forwarder/relay service maintaining the second session if the first session is temporarily lost and re-establishing the virtual connection when then first session is re-established.

2. The method of claim 1 wherein at least one of the connectivity barriers comprises a firewall.

3. The method of claim 1 wherein at least one of the connectivity barriers comprises a consumer gateway.

4. The method of claim 1 wherein the virtual host names comprise part of a hierarchical naming system.

5. The method of claim 1 including providing a directory search application to allow a user to select the virtual host names.

6. The method of claim 1 wherein the source computer system can roam between networks.

7. The method of claim 1 including dynamically assigning at least one server associated with the forwarder/relay service to handle the sessions.

8. The method of claim 1, wherein the proxy network protocol includes at least one of: Hypertext Transfer Protocol (HTTP), File Transfer Protocol (FTP), and SOCKS4/5.

9. The method of claim 1, wherein establishing the second session comprises:
    determining a communication mode for communicating between the destination computer system and the forwarder/relay service; and
    communicating data between the destination computer system and the forwarder/relay service according to the determined communication mode.

10. A method of establishing communications between source and destination computer systems comprising:
    establishing a persistent, bi-directional barrier traversal session, by the source computer system, between the source computer system located behind a first connectivity barrier and a forwarder/relay service, wherein establishing the session includes representing data of a first application in a format associated with a proxy network protocol configured to communicate data corresponding to another application so that the data of the first application is communicated through the first connectivity barrier using the proxy network protocol;
    establishing, by the destination computer system, a persistent, bi-directional barrier traversal transport level communications connection between the forwarder/relay service and the destination computer system, the destination computer system located behind a second connectivity barrier; and
    maintaining the session between the forwarder/relay service and the destination computer system if the session between the source computer system and the service is lost.

11. The method of claim 10 wherein the first and second barriers comprise firewalls.

12. The method of claim 10 wherein the first and second barriers comprise consumer gateways.

13. The method of claim 10 including assigning a server associated with the forwarder/relay service to handle the session.

14. The method of claim 13 wherein the server is dynamically assigned.

15. The method of claim 10 in which the session is established based on a virtual host name associated with the source computer system.

16. The method of claim 15 wherein the virtual host name comprises part of hierarchical naming system.

17. The method of claim 15 including providing a directory search application to allow a user to select the virtual host name.

18. The method of claim 15 wherein the source computer system can roam between networks.

19. The method of claim 10, wherein the proxy network protocol includes at least one of: Hypertext Transfer Protocol (HTTP), File Transfer Protocol (FTP), and SOCKS4/5.

20. The method of claim 10, wherein establishing the transport level communication session between the forward/relay service and the destination computer system comprises:
   determining a communication mode for communicating between the destination computer system and the forwarder/relay service; and
   communicating data between the destination computer system and the forwarder/relay service according to the determined communication mode.

21. An article comprising a computer-readable medium including computer-executable instructions for causing a computer system, in response to a request from a first computer system located behind a first connectivity barrier to establish connectivity to a second computer system, to:
   assign a server to handle a first persistent, bi-directional barrier traversal session, initiated by the first computer system, between the first computer system and a forwarder/relay service, wherein the first computer system is configured to represent data of a first application in a format associated with a proxy network protocol configured to communicate data corresponding to another application so that the data of the first application is communicated through the first connectivity barrier using the proxy network protocol;
   establish a persistent, bi-directional barrier traversal session initiated by the second computer system if the second computer system is located behind a second connectivity barrier; and
   maintain the session between the forwarder/relay service and the destination computer system if the session between the source computer system and the forwarder/relay service is lost.

22. The article of claim 21 including instructions for causing the computer system to establish a transport level communications connection to the second computer system if the second computer system is not located behind a connectivity barrier.

23. The article of claim 21 including instructions for causing the computer system to instruct the first computer system to establish a direct session with the second computer system if the second computer system is not located behind a connectivity barrier.

24. The article of claim 21 including instructions for causing the computer system to establish the forwarder/relay session between the first computer system and the service based on a virtual host name associated with the first computer system.

25. The article of claim 24 wherein the virtual host name comprises part of hierarchical naming system.

26. The article of claim 21, wherein the proxy network protocol includes at least one of: Hypertext Transfer Protocol (HTTP), File Transfer Protocol (FTP), and SOCKS4/5.

27. The article of claim 21, wherein the computer-executable instructions for causing a computer system to establish a session initiated by the second computer system comprises instructions for causing the computer system to:
   determine a communication mode for communicating between the destination computer system and the forwarder/relay service; and
   communicate data between the destination computer system and the forwarder/relay service according to the determined communication mode.

* * * * *